(12) United States Patent
Lee et al.

(10) Patent No.: US 10,739,247 B2
(45) Date of Patent: Aug. 11, 2020

(54) LASER CHARACTERISTIC PROCESSOR

(71) Applicant: BAE Systems Information and Electronic Systems Integration Inc., Nashua, NH (US)

(72) Inventors: Bryan D. Lee, Merrimack, NH (US); Christopher M. Palie, Mont Vernon, NH (US); Andrew J. Radl, Dunbarton, NH (US)

(73) Assignee: BAE Systems Information and Electronics Systems Integration Inc., Nashua, NH (US)

( * ) Notice: Subject to any disclaimer, the term of this patent is extended or adjusted under 35 U.S.C. 154(b) by 171 days.

(21) Appl. No.: 16/176,834

(22) Filed: Oct. 31, 2018

(65) Prior Publication Data

US 2020/0132591 A1    Apr. 30, 2020

(51) Int. Cl.
*G01D 5/32* (2006.01)
*G01N 15/14* (2006.01)

(52) U.S. Cl.
CPC ......... *G01N 15/1436* (2013.01); *G01D 5/32* (2013.01); *G01N 15/1459* (2013.01); *G01N 2015/1447* (2013.01)

(58) Field of Classification Search
CPC ..................... G01N 15/1436; G02B 7/005
See application file for complete search history.

(56) References Cited

U.S. PATENT DOCUMENTS

| 4,261,662 | A | * | 4/1981 | Bluford, Jr. | ........... | H01S 3/0014 356/121 |
| 4,976,543 | A | * | 12/1990 | Scheck | .................... | G01C 3/08 356/624 |
| 2014/0272775 | A1 | * | 9/2014 | Monty | ................. | A61C 1/0046 433/29 |
| 2016/0157958 | A1 | * | 6/2016 | Courtin | .................. | G02B 7/005 433/27 |

* cited by examiner

*Primary Examiner* — Maurice C Smith
(74) *Attorney, Agent, or Firm* — Sand Sebolt & Wernow LPA

(57) ABSTRACT

A system and process for testing and analyzing a laser beam is provided. The system and process allows for repeatable testing of a laser beam to provide a beam intensity profile while accounting for variation in measurements attributable to outside factors. The system and process further allows for simultaneous measurement and analysis of a laser beam having multiple wavelengths.

20 Claims, 7 Drawing Sheets

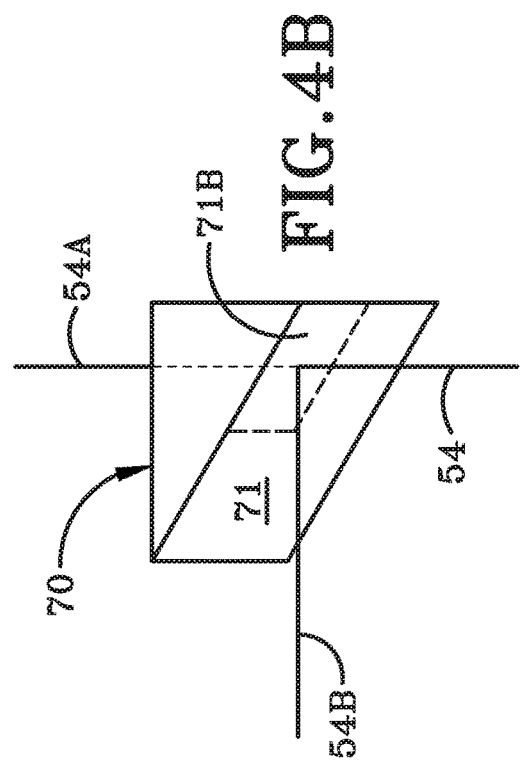
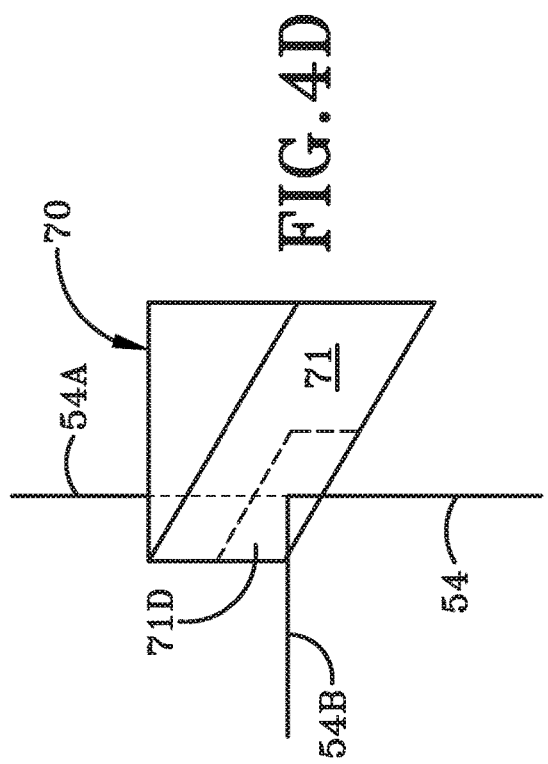
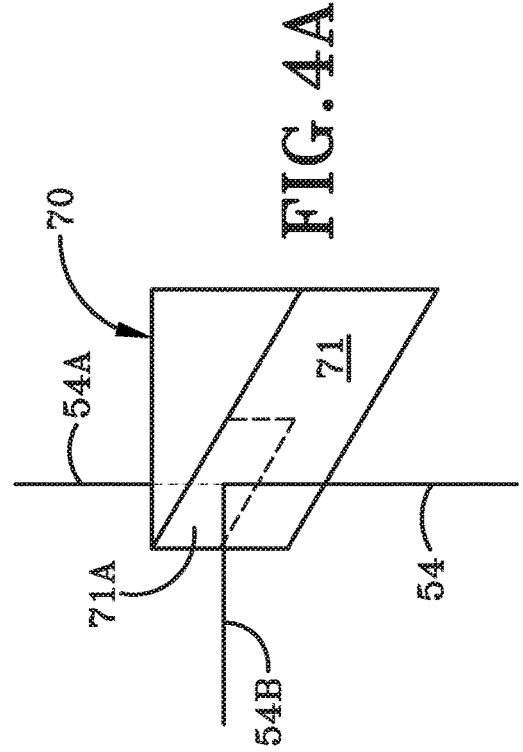
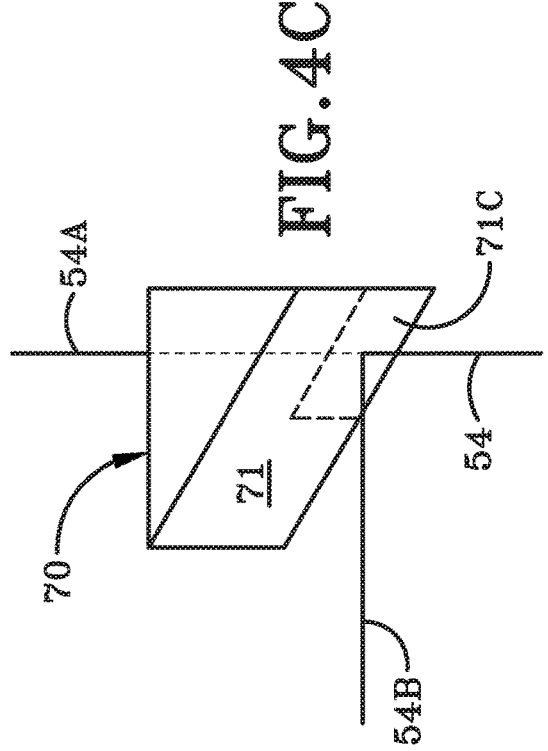

LASER CHARACTERISTIC PROCESSOR

STATEMENT OF GOVERNMENT INTEREST

This invention was made with government support under Contract No. W15P7T-04-D-0055/0023 awarded by the United States Army. The government has certain rights in the invention.

TECHNICAL FIELD

The present disclosure relates generally to the field of laser intensity measurement systems. More particularly, in one example, the present disclosure relates to a system and method of measurement of the radiant intensity of a laser beam that is repeatable and reliable. Specifically, in another example, the present disclosure relates a system and method of measurement of the characteristics of a laser beam that can reliably and repeatedly measure these characteristics of a laser beam having multiple wavelengths while accounting for movement and distortion thereof.

BACKGROUND

Lasers have a wide variety of applications, ranging in use from optical drives, printers, scanners, communication systems, or pointing systems, all the way up to cutting and welding materials, measuring distance and/or speed, as well as in medical applications, such as laser surgery and skin treatments. Lasers may also be used in military applications for long-distance communications, marking targets, measuring target range, and some lasers are even being developed for use as defensive countermeasures.

In the production and operation of lasers, it is advantageous to be able to process and analyze data relative to the characteristics of a laser's output, specifically factors such as the radiant intensity, which is the energy over an angular area of the laser, the wavelength, spectral output of the laser, stability of the laser beam, and/or beam diameter can give valuable information to a laser user and/or manufacturer as to the quality of those aspects. This can allow increased productivity and repeatability of laser manufacture and use of the laser measurements and analysis of laser data can be assessed against application requirements to insure the laser being used meets the minimum requirements for the desired implementation. Further, it can be used during the manufacture of lasers to quality test products before they are shipped out and/or delivered to an end customer. Additionally, the use of analytical data relative to the laser beam can further assist in the design and manufacture of new lasers for as to yet unknown applications.

Current techniques and tools for the measurement and collection of such data, however, can be unreliable and/or suffer from low repeatability as current techniques typically include measurement techniques that cannot account for multiple variables simultaneously while recording data using computer data programs and/or a manual paper process to record data and process and analyze that those data that are collected. Current systems are therefore subject to error and suffer from low repeatability. These techniques can vary depending upon the person or entity performing the tests as each individual technique may vary in steps and/or analysis. Further, many of the current processes have not been subjected to peer-review or similar marketplace correction, therefore introducing a further aspect of unreliability into each individual technique.

SUMMARY

This application addresses these and other issues by providing a system and calculation tool to measure, collect, and analyze laser data that is both more reliable and repeatable across multiple tests.

In one aspect, an exemplary embodiment of the present disclosure may provide a method of collecting laser data comprising: generating a reference laser from a laser generator; reflecting the reference laser off a face of a beam director assembly to a detector; recording the coordinates of the reference laser on the detector; turning the reference laser generator off; generating a laser beam from the beam director assembly to the detector; and recording laser data from the beam via the detector. This exemplary embodiment or another exemplary embodiment may further provide reflecting the reference laser off of an off-axis parabola between reflecting the reference laser off a face of the beam director assembly and reflecting the reference laser to the detector. This exemplary embodiment or another exemplary embodiment may further provide wherein the detector is a focal plane array. This exemplary embodiment or another exemplary embodiment may further provide passing the laser beam from the beam director assembly through at least one spectral filter before it reaches the detector. This exemplary embodiment or another exemplary embodiment may further provide splitting the laser beam from the beam director assembly into a first beam having a first beam path and a second beam having a second beam path after generating the laser beam from the beam director assembly; and, directing the first beam of the laser to a first detector and directing the second beam of the laser to a second detector. This exemplary embodiment or another exemplary embodiment may further provide recording laser data from the first beam via the first detector; and recording laser data from the second beam via the second detector. This exemplary embodiment or another exemplary embodiment may further provide wherein recording laser data from the first beam via the first detector and recording laser data from the second beam via the second detector occurs simultaneously. This exemplary embodiment or another exemplary embodiment may further provide wherein splitting the laser is done with an optical wedge. This exemplary embodiment or another exemplary embodiment may further provide wherein the optical wedge has a first quadrant, a second quadrant, a third quadrant, and a fourth quadrant, the method further comprising: splitting the laser beam into the first beam and second beam by directing the laser beam to each of the first, second, third, and fourth quadrants of the optical wedge; and recording the laser data from the first beam via the first detector and the second beam via the second detector for each laser beam position from the first, second, third, and fourth quadrants of the optical wedge. This exemplary embodiment or another exemplary embodiment may further provide passing the first beam through at least one spectral filter before it reaches the first detector; and, passing the second beam through at least one spectral filter before it reaches the second detector.

In another aspect, an exemplary embodiment of the present disclosure may provide a method of analyzing laser data comprising: generating a laser beam having at least two wavelengths from a beam director assembly to a detector; recording the (x,y) coordinates of the beam spot centroid on the detector; recording the (x,y) coordinates of each pixel in the detector; calculating a radiant intensity profile of the laser beam; and, comparing the radiant intensity profile of the laser beam to a preset minimum required profile to determine if the laser beam meets or exceeds the minimum requirement. This exemplary embodiment or another exemplary embodiment may further provide accepting the laser beam if it meets or exceeds the minimum requirement or rejecting the laser beam if it fails to meet the minimum requirement. This exemplary embodiment or another exemplary embodiment may further provide wherein the detector is a focal plane array detector. This exemplary embodiment or another exemplary embodiment may further provide filtering the laser beam to a single wavelength prior to reaching the detector; and measuring the wavelength of the laser beam at the detector. This exemplary embodiment or another exemplary embodiment may further provide wherein calculating the radiant intensity profile further comprises: orienting an image of the laser beam on the detector; subtracting image bias from detector image; calculating the signal to noise ratio of the image; calculating the pixel location of the image centroid and the aperture energy radius; calculating the beam diameter and the angular skew of the beam; calculating the intensity energy of the beam; comparing the intensity profile to an ideal Gaussian profile; converting pixel data to an angular coordinate frame and a spatial coordinate frame; and, calculating the power factor of the laser beam. This exemplary embodiment or another exemplary embodiment may further provide splitting the laser beam into a first beam with a first beam path directed to a first detector and a second beam with a second beam path directed to a second detector prior to filtering the laser beam; filtering the first beam to a first wavelength prior to reaching the first detector; filtering the second beam to a second wavelength prior to reaching the second detector; and, measuring the first wavelength at the first detector and the second wavelength at the second detector. This exemplary embodiment or another exemplary embodiment may further provide wherein splitting the laser beam is done with an optical wedge. This exemplary embodiment or another exemplary embodiment may further provide wherein the optical wedge has a first quadrant, a second quadrant, a third quadrant, and a fourth quadrant, the method further comprising: splitting the laser beam into the first beam and second beam by directing the laser beam to each of the first, second, third, and fourth quadrants of the optical wedge; and measuring the first wavelength at the first detector and the second wavelength at the second detector for each laser beam position from the first, second, third, and fourth quadrants of the optical wedge.

In another aspect, an exemplary embodiment of the present disclosure may provide a method of collecting and analyzing laser beam data comprising: generating a reference laser from a laser generator; reflecting the reference laser off a face of a beam director assembly to a detector; recording the coordinates of the reference laser on the detector; turning the reference laser generator off; generating a laser beam having at least two wavelengths from the beam director assembly to the detector; recording the (x,y) coordinates of the beam spot centroid on the detector; recording the (x,y) coordinates of each pixel in the detector; calculating a radiant intensity profile of the laser beam; and, comparing the radiant intensity profile of the laser beam to a preset minimum required profile to determine if the laser beam meets or exceeds the minimum requirement. This exemplary embodiment or another exemplary embodiment may further provide wherein calculating the radiant intensity profile further comprises: orienting an image of the laser beam on the detector; subtracting image bias from detector image; calculating the signal to noise ratio of the image; calculating the pixel location of the image centroid and the aperture energy radius; calculating the beam diameter and the angular skew of the beam; calculating the intensity energy of the beam; comparing the intensity profile to an ideal Gaussian profile; converting pixel data to an angular coordinate frame and a spatial coordinate frame; and, calculating the power factor of the laser beam.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 4A (FIG. 4A) is an operational left side isometric view of a first quadrant of the beam splitter from FIG. 4.

FIG. 4B (FIG. 4B) is an operational left side isometric view of a second quadrant of the beam splitter from FIG. 4.

FIG. 4C (FIG. 4C) is an operational left side isometric view of a third quadrant of the beam splitter from FIG. 4.

FIG. 4D (FIG. 4D) is an operational left side isometric view of a fourth quadrant of the beam splitter from FIG. 4.

Similar numbers refer to similar parts throughout the drawings.

DETAILED DESCRIPTION

Figure 1A:
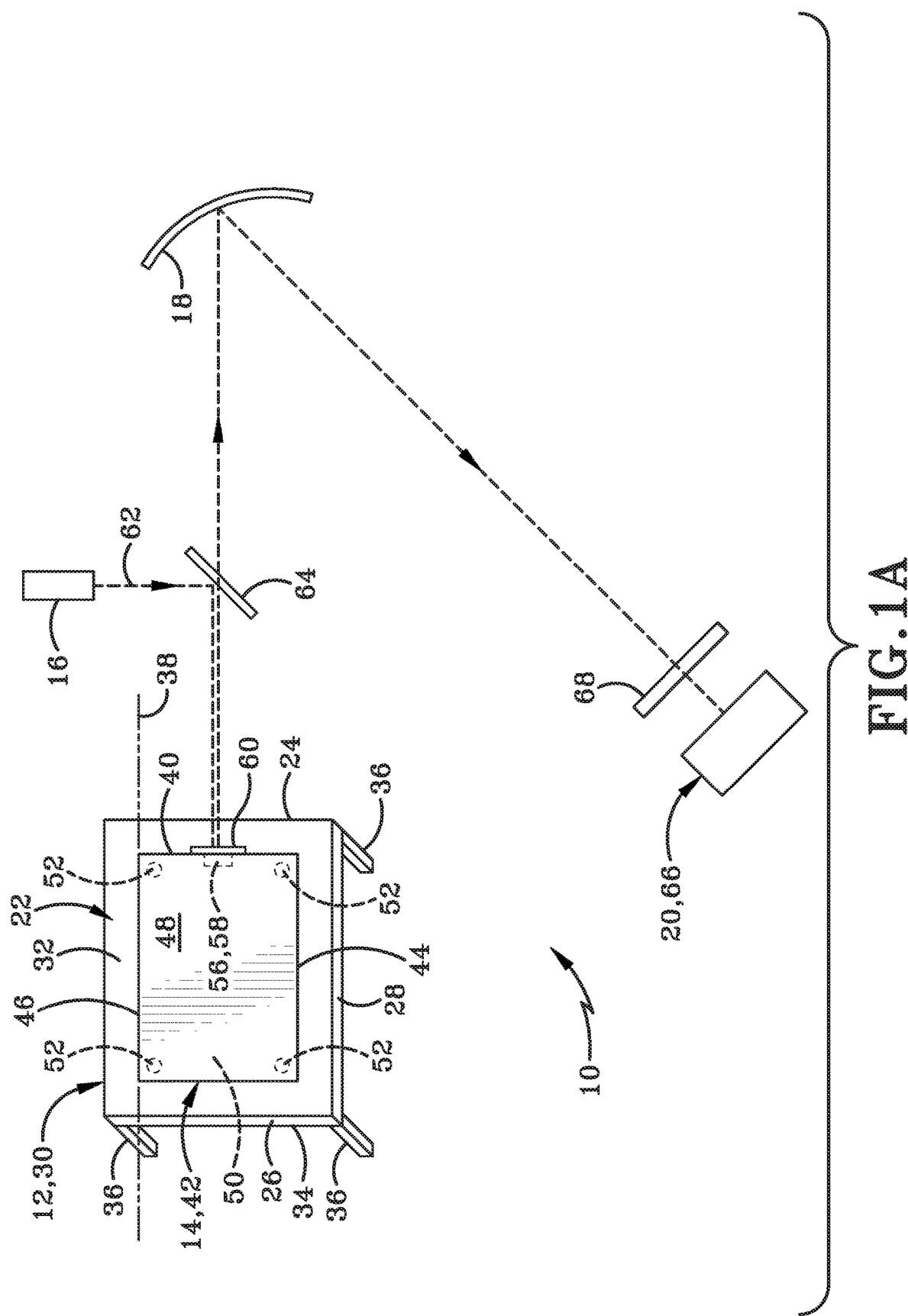
FIG. 1A (FIG. 1A) is an overhead schematic view of a laser characteristic measurement system with the reference laser beam of the present disclosure shown.

Provided and described herein is a laser measurement system generally indicated as reference 10 which may include an optical table 12, a beam director assembly 14, a reference laser generator 16, off-axis parabola 18, and at least one detector 20.

Figure 1B:
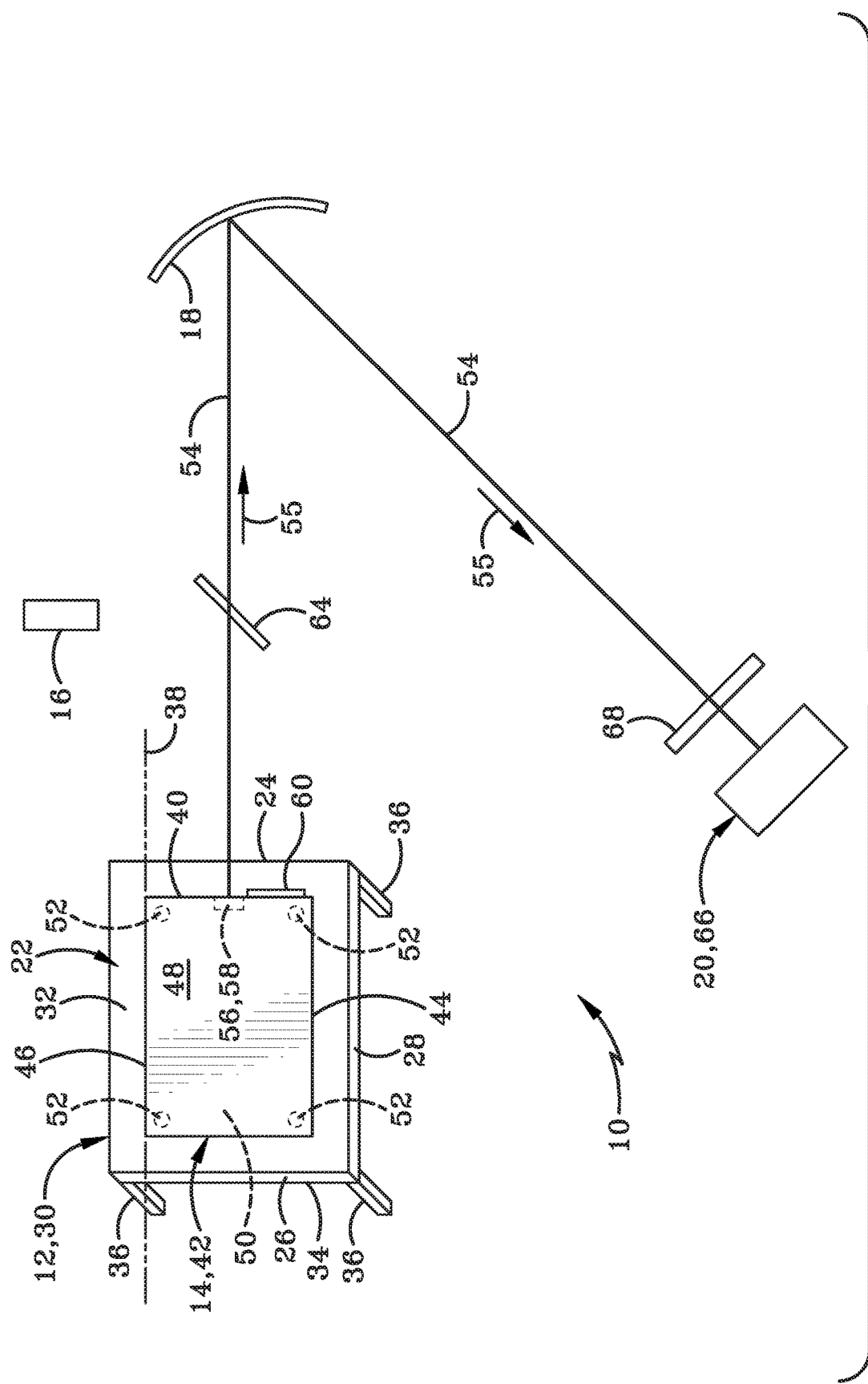
FIG. 1B (FIG. 1B) is an overhead schematic view of the laser characteristic measurement system of FIG. 1 with a test laser beam shown.

With reference to FIGS. 1A and 1B, optical table 12 may include a tabletop or mounting surface 22 having a front edge 24 and a back edge 26 defining therebetween a longitudinal direction, a left edge 28, and a right edge 30 defining therebetween a horizontal direction, a top surface 32, and a bottom surface 34 defining therebetween a vertical thickness of tabletop 22.

Optical table 12 may further include one or more mounting feet 36. According to one aspect, mounting feet 36 may be adjustable or may include one or more adjustment mechanisms to allow tabletop 22 to move longitudinally, horizontally, and/or vertically according to the desired implementation. According to another aspect, mounting feet 36 may further allow for rotational movement, thereby allowing tabletop 22 to tip or tilt relative to the ground surface as dictated by the actual use conditions, discussed further herein with respect to the operation of system 10. Movement of tabletop 22 via mounting feet 36 or adjustment mechanisms attached thereto may be manually operated, motorized, and/or automated as chosen by a person of skill in the art. According to one example, mounting feet 36 may include a manual adjustment screw type mechanism that can move tabletop 22 relative to the mounting feet 36 through the rotation of the adjustment screws. According to another example, mounting feet 36 may include a motorized adjustment mechanism operable to move tabletop 22 relative to the mounting feet 36. The actual adjustment mechanism employed may vary depending on the desired implementation and may be chosen by a person of skill. According to another aspect, tabletop 22 may be fixed relative to the mounting feet 36.

Tabletop 22 of optical table 12 may serve as a mounting plate or mounting point for beam director 14 and may further include a mounting plane 38 which may be substantially defined by one or more of left edge 28, right edge 30, front edge 24, and/or back edge 26. According to one aspect, mounting plane may be defined by left edge 28 such that beam director assembly 14 is mounted in a longitudinal direction substantially parallel to left edge 28 of tabletop 22. According to another aspect, mounting plane 38 may be a separate structure (note shown) that may attach to or otherwise be mounted on tabletop 22 to provide a reference plane for the mounting of beam director assembly 14, as further described herein.

Beam director assembly 14 (BDA) may be an enclosed structure having a generally rectangular shape housing one or more mirrors and/or operable to direct a laser beam and/or redistribute a laser beam as it passes through BDA 14. The specific configuration of mirrors and/or optics within BDA 14 can vary depending upon the desired beam path, beam size, and/or beam properties and can be adjusted according to the installation parameters. The operation of BDA 14 is further described herein.

According to one aspect, BDA 14 may be a rectangular shaped enclosure having a front side 40 spaced longitudinally apart from a back side 42. BDA 14 may further include a horizontally spaced left side 44 and right side 46 corresponding to left edge and right edge 28, 30 of tabletop 22. BDA 14 may have a top surface 48 spaced vertically apparat from a bottom 50. Bottom 50 may include one or mounting points (not shown) to secure BDA 14 to optical table 12. According to one aspect, mounting points may be one or more holes defined within bottom 50 to allow BDA 14 to be screwed or bolted to optical table 12 according to the desired implementation. According to another aspect, BDA 14 may include one or more feet 52 operationally attached to bottom 50 of BDA 14 for support thereof.

Similar to mounting feet 36, feet 52 of BDA 14 may be adjustable or include adjustment means to effect movement of the BDA 14 in longitudinal, horizontal, vertical, tip, and/or tilt directions relative to tabletop 22. Movement of BDA 14 may allow for proper alignment of beam 54, as further discussed with regards to the operation of system 10. According to one aspect, optical table 12 may further include one or more nudgers (not shown) aligned with BDA 14 and operable to effect fine/precision movements of BDA 14 to bring beam 54 into alignment, as further discussed below. Nudgers may be of a known type and may include an adjustment mechanism separate and distinct from any adjustment mechanism associated with feet 52 or mounting feet 36. According to one aspect, nudgers may be a ball type nudger. According to another aspect, nudgers may be kinematic nudgers that may further be used with kinematic stops.

According to one aspect, BDA 14 may contain a laser generator capable of generating the laser beam 54 to be tested as further described herein. According to this aspect, laser beam 54 may be generated as a single beam 54 having more than one simultaneous spectral output as discussed further herein. According to another aspect, laser beam 54 may be generated within BDA 14 as a beam having a single wavelength that passes through one or more conversion crystals within BDA 14 thereby separating beam 54 into two or more spectral outputs that are co-aligned along the same pathway as discussed further herein. According to another aspect, beam 54 may initially be generated by more than one laser beam generator within BDA 14 and may be combined into a single output beam 54 having multiple spectral characteristics. According to another aspect, the multiple spectral characteristics of beam 54 may be two wavelengths traveling along the same pathway as further described and discussed herein.

BDA 14 may further include an aperture 56 defined through one of the sides of BDA 14. According to one aspect, aperture 56 may be defined through front side 40 of BDA 14. Aperture 56 may be a full thickness opening defined in front side 40 to allow beam 54 to pass through front side 40. According to one aspect, aperture 56 may include an optical lens 58 or another optical element therein to further allow or assist with propagation of beam 54. According to another aspect, optic lens 58 may be a collimator to further direct beam 54 along the desired pathway according to the desired implementation.

BDA 14 may further include a mirror 60 installed on front side 40 of BDA 14 adjacent to aperture 56. According to one aspect, mirror 60 may be a standard optical mirror having a reflective coating. According to another aspect, mirror 60 may be a reflective coating of front side 40 of BDA 14. The placement of mirror 60, as discussed further below with respect to operation, may be in one example adjacent to aperture 56. In another example, mirror 60 may surround aperture 56. In yet another example, mirror 60 may be integrated into aperture 56 as a two-way type optical structure that may allow beam 54 to pass out of BDA 14 while reflecting any beams traveling along beam pathway towards BDA 14 as described and discussed further herein.

According to another embodiment, laser beam 54 may be generated remotely from BDA 14 and delivered thereto by an input operable to carry a laser beam therein. One example of such an input would be fiber optic cables and couplers. Further, according to this embodiment, one or more laser beams may be delivered to BDA 14 prior to being processed through BDA 14 by way of the one or more mirrors and/or optic elements contained therein.

With reference to FIG. 1A, reference laser generator 16 may be a separate laser generator disposed outside of BDA 14 and may generate a reference beam 62. Reference beam 62 may be a Helium-Neon (HeNe) laser, an infrared laser, or any other laser suitable for the application as chosen by a person of skill. The choice of laser type for reference laser generator 16 and reference laser 62 may be tied to the detector 20 being used to ensure that reference laser 62 is compatible with the detector 20 being used.

As discussed further herein with regards to the operation thereof, reference beam 62 may be folded into the beam path by a fold mirror 64. According to one aspect, fold mirror 64 may be a standard pellicle, optic or folding mirror which can allow reference generator 16 to be placed to the side of beam path 55 and folded into beam path 55 as further discussed herein.

Measurement system 10 may further include an off-axis parabola 18 spaced apart from BDA 14 and optical table 12. Off-axis parabola 18 may be a precision off-axis parabolic reflector or mirror. Off-axis parabola 18 (also referred to herein as parabola 18) can be precision machined or manufactured from a highly reflective material or can be coated with a chemical or physical coating to increase reflectivity of parabola 18. According to one aspect, parabola 18 may be mirror glass.

Off-axis parabola 18 may have a focal length that can vary according to the desired implementation. Generally speaking, using a longer focal length for parabola 18 can provide additional accuracy to the measurement system 10; however, a balance must be struck because a longer focal length for parabola 18 requires a larger detector 20. Therefore, the size of detector 20 is often the limiting factor for the focal length of parabola 18. Further, as discussed below with regards to the operation of system 10, beam 54 may move relative to detector 20 during testing, due to factors such as temperature or vibration. Beam 54 may also be intentionally moved during operation, as discussed below. Therefore, a balance must also be struck between the expected movements of beam 54 with the size of detector 20.

Detector 20 may be any type of optical detector as shown by a person of skill dependent upon the beam properties being measured. According to one aspect, detector 20 may be a focal plane array 66 (FPA). FPA 66 may be an imaging device having a series of light-sensing pixels arranged in a square or rectangular pattern. As discussed above, the size of FPA 66 may be a limiting factor for the setup of system 10 so the appropriate size of an FPA 66 may vary and may be chosen by a person of skill as dictated by the specific configuration of measurement system 10. Some of the relevant factors to the size of FPA 66 may include the desired resolution of FPA 66, the focal length of parabola 18, and/or the size of the beam 54 being measured. According to one example, focal plane array may have a pixelated grid with a single or subpixel resolution. According to another aspect, FPA 66 may include a camera or other imaging device that can receive and/or record the location of a laser beam spot on the FPA 66 grid.

According to another aspect, detector 20 may be a power meter or any other optical detector as chosen by a person of skill in the art. Detector 20 and/or FPA 66 may further include one or more spectral filters 68 operable to filter out specific laser wavelengths from beam 54 while allowing other specific wavelengths to pass through filter 68 as discussed further herein.

Figure 2:
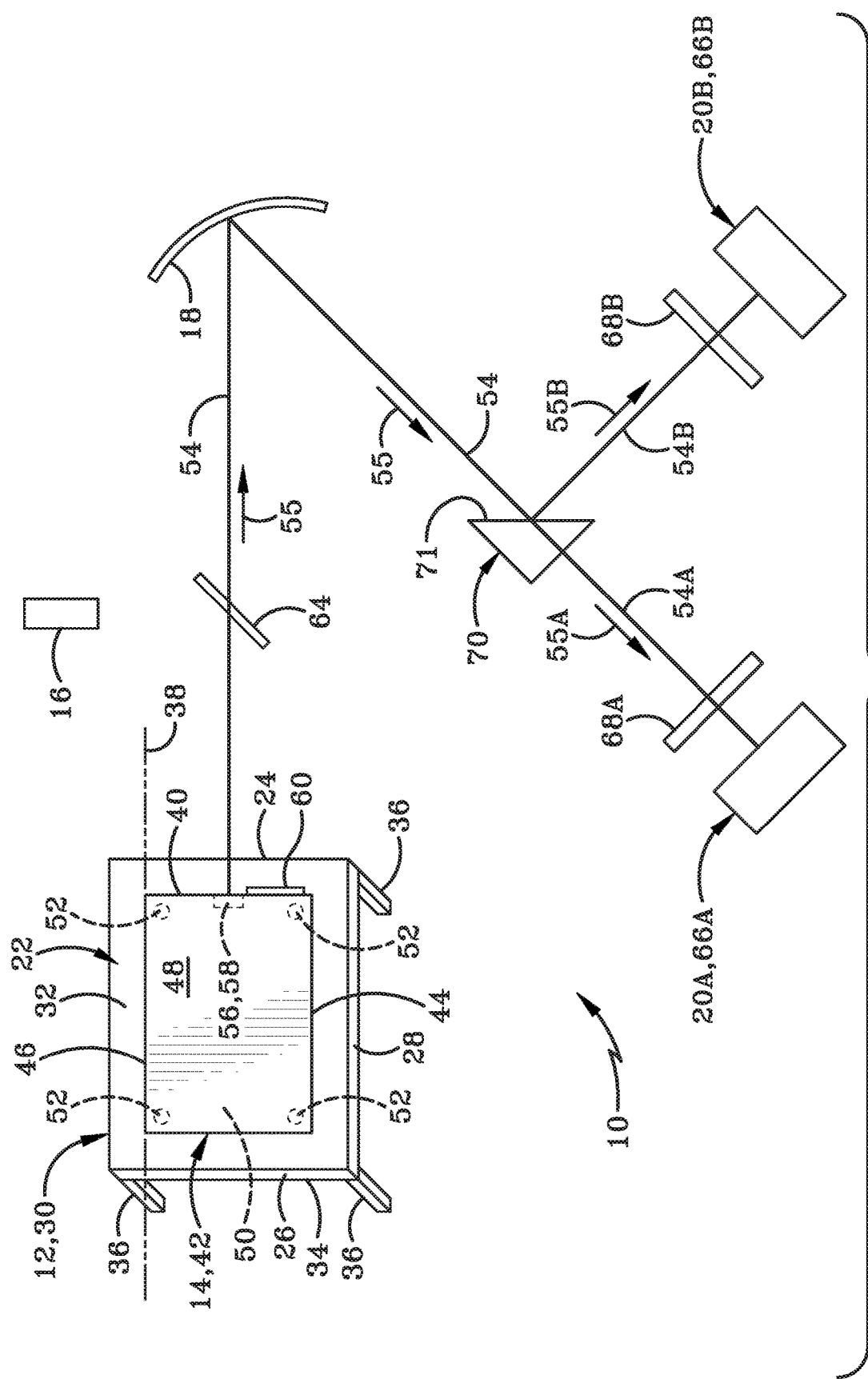
FIG. 2 (FIG. 2) is an overhead schematic view of an alternate embodiment of the laser characteristic measurement system of the present disclosure.
Figure 3:
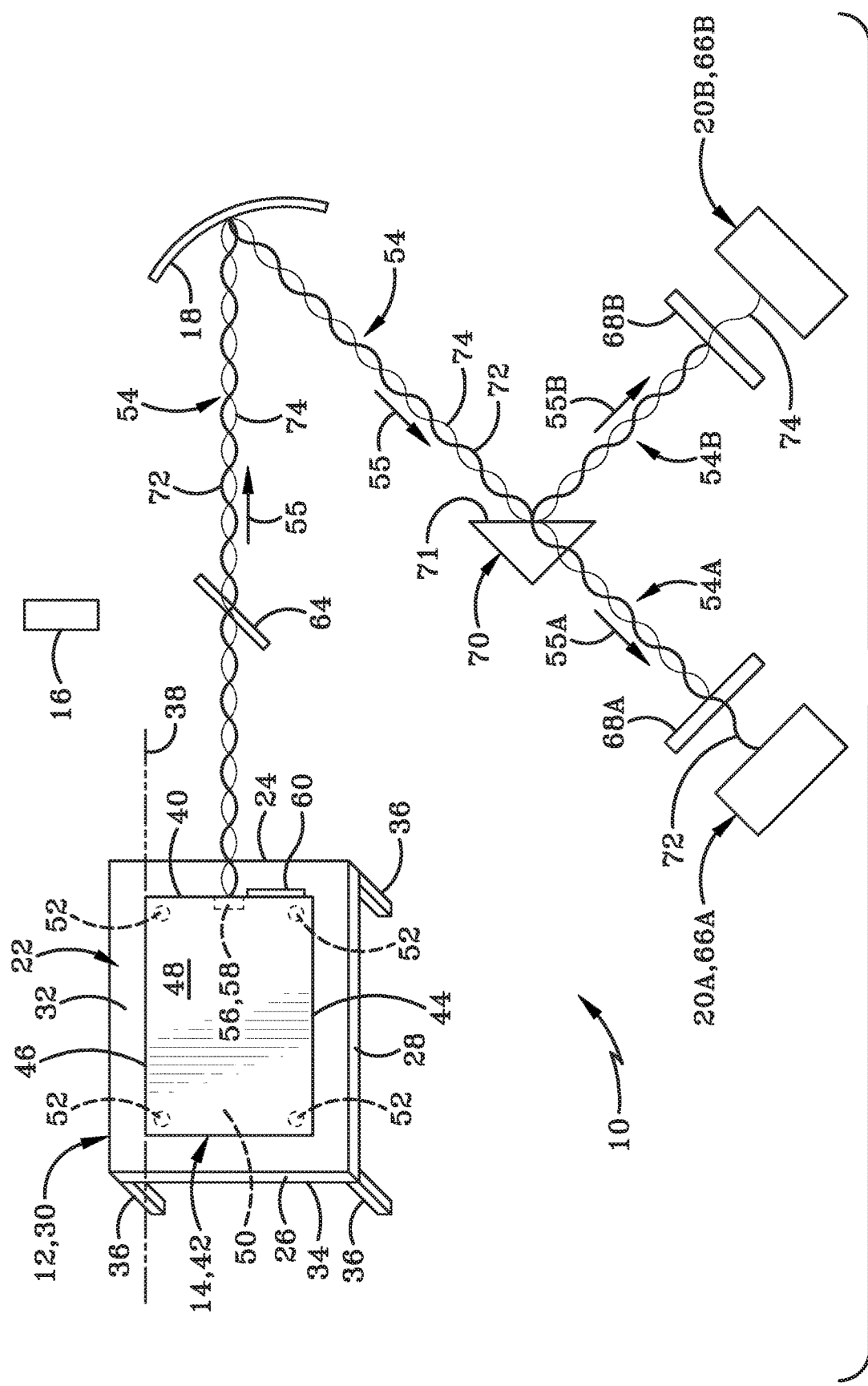
FIG. 3 (FIG. 3) is an overhead schematic view of the embodiment of FIG. 2 with the wavelengths of the test laser beam shown.

With reference to FIGS. 2 and 3, measurement system 10 may further include a splitter 70 positioned in beam path 55 after beam 54 reflects off of the off-axis parabola 18. As discussed further herein, splitter may divide beam 54 into a fist beam 54A and a second beam 54B, thus creating two pathways, indicated as pathway 55A and pathway 55B, from splitter 70 on towards detector 20. According to this embodiment, two detectors 20A and 20B may be used to measure beam 54 properties simultaneously in two positions. Further, according to this aspect, multiple spectral filters 68A and 68B may be used to filter out specific wavelengths as further illustrated in FIG. 4 and discussed below with regards to operation of system 10.

According to one aspect, splitter 70 may be a pellicle such as a thin film splitter. According to another aspect, splitter 70 may be a standard optical lens to divide beam 54 into two paths 55A and 55B. According to another aspect, splitter 70 may be an optical wedge.

Having thus described the individual components and elements of system 10, the operation thereof will now be discussed.

With reference generally to the figures, a laser that is being subjected to testing ("test laser") may be integrated into BDA 14 such that test laser is synonymous with laser beam 54. Accordingly, setup of system 10 first dictates that the test laser be generated or transmitted from the BDA 14 by using a laser generator installed therein or by delivering laser to the BDA 14 as previously discussed. Once the test laser is installed or otherwise connected with BDA 14, it becomes part of system 10 such that references herein to BDA 14 should be understood to include the test laser.

The test laser is a laser of interest in that it may be an existing laser being tested to ensure it meets situational requirements for a new application or implementation, or it may be a newly designed laser being manufactured for a specific purpose. In either scenario, the test laser may be evaluated to determine whether or not it will be suitable for the intended purpose. In such testing, it is contemplated that the test laser will generate usable data, which in turn may be fed into or otherwise provided to a calculation tool ("calculator") which may assist an operator in the analysis of the laser test data to verify whether or not the test laser meets or exceeds a pre-determined criteria profile of the desired implementation. It will be therefore understood, that the test criteria may vary depending on the desired use of the laser, however, the systems and methods provided herein may allow for repeatable data collection and analysis of a test laser, with the only regard to the pre-determined criteria being a final comparison to ensure such criteria are met.

Calculator may be a computer software program or may be utilized as part of an existing computer software suite that is stored on a non-transitory medium such as a read-only memory or hard drive that is in communication with a processor, series of processors, logic, or the like that can encode and/or execute a series of instructions written thereon to effect method 500 using calculator, as discussed further herein.

Figure 5:
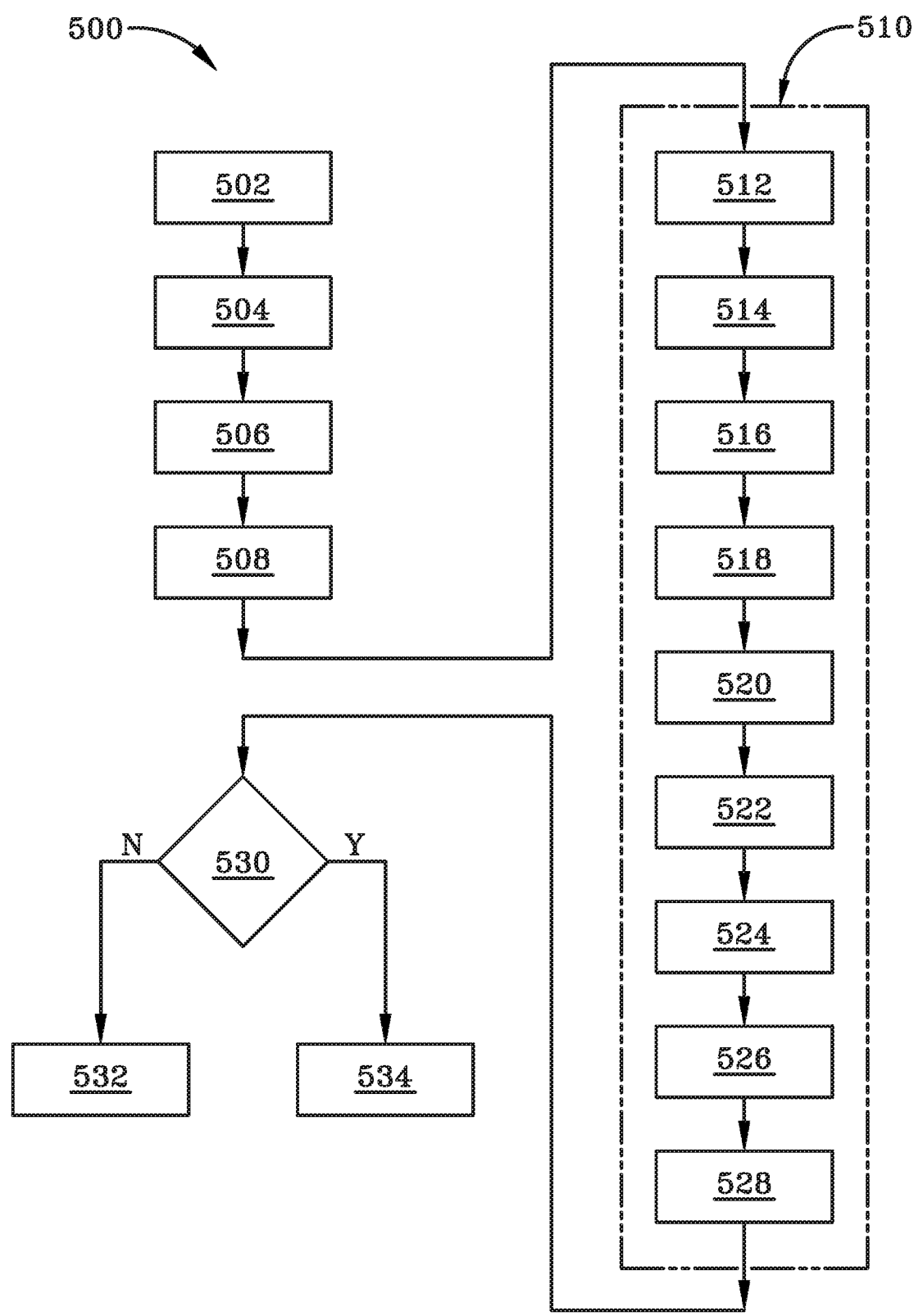
FIG. 5 (FIG. 5) is a flow chart of a method of use for the laser characteristic measurement system of the present disclosure.

Therefore, operation of system 10 (the method 500 of which is indicated in FIG. 5 as reference 500) may start with the alignment of BDA 14 which is installed on optical table 12. BDA 14 may be aligned to mounting plane 38 which can be an axis of alignment that is generally and substantially parallel to beam path 55 of laser beam 54. According to one aspect, mounting plate 38 may be simultaneously substantially parallel to beam path 55 while also being substantially parallel to one or both of left edge 28 or right edge 30 of tabletop 22. Laser beam 54 has an idealized output vector as established by the position of the BDA 14 relative to the mounting feet 36 of optical table 12 and is therefore is anticipated to strike detector 20 such that beam 54 may be accurately detected and measured thereon.

To ensure accurate placement of beam 54 on the detector 20, once BDA 14 is installed on optical table 12, reference laser generator 16 may be switched on and reference beam 62 may be folded into beam path 55 via fold mirror 64. Due to the nature and positioning of reference laser generator 16, reference beam 62 can back propagate off of fold mirror 64 along beam path 55 to BDA 14 where it can reflect off mirror 60 and then travel forward along beam path 55 to off-axis parabola 18 reflecting therefrom ultimately terminating at detector 20. Illustration of the reference laser 62 is best shown in FIG. 1A, where reference laser 62 is represented as a dotted line. Reference laser 62 is then recognized as a visual indication of where beam 54 is expected to fall on detector 20 once beam 54 is turned on. Position of optical table 12 and/or BDA 14 may be adjusted at this point to insure the presence of reference laser 62 on detector 20.

Once reference laser 62 is visualized on detector 20, reference generator 16 may be switched off in favor of beam 54 which may then be powered on. The idealized output vector of beam 54, as illustrated by reference laser 62 in the previous step, should result in beam 54 following path 55 and terminating on detector 20 at or near the same position that reference laser 62 previously occupied. Any observed difference between the position of reference laser 62 and the position of laser beam 54 on the detector 20 may be recorded and accounted for later in method 500. Beam path 55 of laser beam 54 is best illustrated in FIG. 1B.

Depending upon the desired laser beam data to be collected in method 500, the number of detectors 20 may vary as discussed above. For example, as shown in FIGS. 1A and 1B, a single detector 20, such as an FPA 66, may be used to measure one or more properties of laser beam 54 as desired.

According to another aspect, as best seen in FIG. 2, a splitter 70 may be employed to separate beam 54 into first beam 54A and second beam 54B following paths 55A and 55B, respectively, after beam 54 encounters splitter 70. In this aspect, two detectors 20A and 20B may be utilized. According to another aspect, detectors 20A and 20B may be two focal plane arrays 66A and 66B, respectively.

With reference to FIG. 3, according to one aspect, beam 54 may have more than one wavelength represented as a first wavelength 72 and a second wavelength 74. To the naked eye, beam 54 would appear as a solitary laser beam following beam path 55. However, within beam 54, multiple wavelengths may be present, as discussed above, via generation of a single beam that is passed through a conversion crystal and separated into two co-aligned outputs traveling along beam path 55 or by generating multiple beams having different wavelengths that are then combined and collimated into a single output traveling along beam path 55. Regardless of the source of the multiple wavelengths of the first and second wavelengths 72, 74, beam 54 may be measured according to the following.

According to one embodiment, laser beam 54 data may then be collected using the configuration of system 10 illustrated in FIGS. 1A and 1B such that laser beam 54 may be first fired through a first spectral filter 68A to filter out one of the first or second wavelengths 72 or 74 while allowing the other to pass through to detector 20. Then beam 54 may be turned off while filter 68A may be replaced with filter 68B and beam 54 may again be generated and now directed through filter 68B filter out the other of first or second wavelengths 72 or 74 while allowing the other to pass through to detector 20. This technique may provide data relative to the angular difference between the two wavelengths 72, 74; however, this embodiment assumes no variance or change in laser beam 54 or the properties thereof other than the change in spectral filter used.

According to another embodiment, splitter 70 may be introduced as a pellicle which can split beam 54 into first beam 54A and second beam 54B thereby directing first and second beams 54A, 54B along separate beam paths 55A, 55B to separate detectors 20A, 20B. According to this aspect, this setup can allow simultaneous measurement of beams 54A and 54B providing two sets of data from separate detectors 20A, 20B, however, as pellicles are known to have issues of absorption and/or movement due to temperature or vibration, this embodiment may result in slight variations between first and second wavelengths 72, 74 that may not be attributable to the alignment of the wavelengths 72, 74 relative to each other, but rather attributable to outside influence and/or variation.

Figure 4:
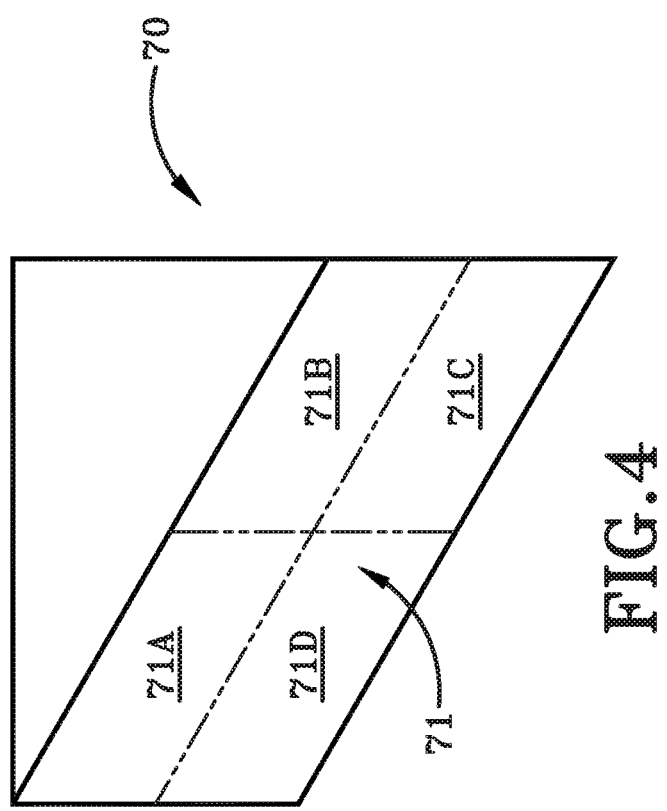
FIG. 4 (FIG. 4) is left side isometric view of an embodiment of a beam splitter of the present disclosure.

With reference to FIG. 4, according to another embodiment where splitter 70 is employed as an optical wedge, the first surface of splitter 70 encountered by beam 54 as it travels along beam path 55 may be indicated as face 71. This face 71 may be conceptually divided into four quadrants, namely, a first quadrant 71A, a second quadrant 71B, a third quadrant 71C, and a fourth quadrant 71D. It is then contemplated by method 500 that beam 54 may be independently fired to each of the four quadrants 71A-71D of face 71 and data collected therefrom. This may result in two sets of data from each of the four firings of laser beam 54 giving a total of eight data sets consisting of four pairs of data. Each pair of data may represent the data collected at each detector 20A and 20B for each firing. Then, due to the fact that an optical wedge is of a non-uniform thickness, this intentionally introduces an angular displacement into the data, corresponding to the thickness of the wedge for each quadrant 71A-D. This angular displacement may then allow any error introduced into the measurement of laser beam 54 to be later calculated and removed, thus providing more accurate and reliable results.

Further according to this embodiment where splitter 70 is an optical wedge, with reference to FIGS. 4A-4D, laser beam 54 is shown striking splitter 70 on face 71 in each of the four quadrants 71A-D and splitting into first beam 54A and second beam 54B, respectively. As shown in FIGS. 4A-4D, each of the quadrants may give a different data set due to the non-uniform thickness of splitter 70.

It will be understood that embodiments employing a splitter 70 (regardless of whether that splitter is a pellicle, an optical wedge, or another known splitting device) beam 54 may reflect off of the off-axis parabola 18 and directed to splitter 70 where it may be divided into first beam 54A and a second beam 54B. Each of beams 54A, 54B may maintain both wavelengths 72, 74 with first beam 54A passing through splitter 70 and second beam 54B reflecting off of splitter 70.

The co-alignment of first and second wavelengths 72, 74 defined as as the angular difference between the first and second wavelengths 72, 74 within beam 54, can tell the operator how well the two wavelengths were combined (in the case of two beams brought into one) and/or converted (in the case of one beam passing through a conversion crystal) within BDA 14. As the co-alignment of the first wavelength 72 and the second wavelength 74 within beam 54 may be a measured property of laser beam 54, it may be desirable to have each wavelength 72, 74 measured separately, but simultaneously. Therefore, according to this aspect, first beam 54A may be filtered by first filter 68A prior to reaching first detector 20A while second beam 54B may be filtered by a second filter 68B prior to reaching second detector 20B. Filters 68A and 68B may be spectral filters that may filter out opposing wavelengths such that first wavelength 72 may pass freely through filter 68A and may reach detector 20A while second wavelength 74 is absorbed by filter 68A. Likewise, second wavelength 74 may then pass through filter 68B and reach detector 20B while first wavelength 72 is thereby absorbed. This can allow simultaneous but separate measurements of first wavelength 72 on detector 20A and second wavelength 74 on detector 20B as illustrated in FIG. 3.

As detector 20 or detectors 20A and 20B receive beam 54 or beams 54A and 54B respectively, useful data is generated regarding various aspects of laser beam 54. Relevant characteristic data may include: the radiant intensity of the beam, defined as the energy over the angular area of the beam 54 spot on the detector 20; one or more quality metrics of the beam 54 such as the specific wavelength or spectral output of the beam 54; the bias and/or jitter of the beam, which is a qualification of the stability of the beam as it is generated; and/or the beam diameter.

As these data are collected, they can be fed into or otherwise provided to calculator for analysis which can further use these data to compare aspects of beam 54 to a predetermined specification of beam requirements to ensure beam meets or exceeds these predetermined requirements.

The projection of beam 54 on the detector(s) 20 may produce an image, which may be a snapshot or profile of the beam 54 as it appears on detector 20 at any given moment in time. This image may be manipulated for analysis such that the image can best illustrate the projection of beam 54 on detector 20. For example, the image can be rotated, flipped, mirrored, etc. to better align the image for processing.

The calculator may then utilize the matrix of data received from detector(s) 20, including the image of the beam 54 on the detector(s) 20, to provide a radiant intensity profile of the laser beam 54 according to the following method:

Once the image is manipulated into the proper position for analysis, an image bias may be calculated and subtracted therefrom to insure the image is of a sufficient resolution for proper analysis. The image bias may be calculated as pixel values having the highest frequency. This can then be set as the background "black level" which may then be subtracted from the image. The image bias may be calculated and removed according to the following:

```
Input:     Camera image, S
           Number of histogram bins, NBins
Output:    Camera image adjusted for camera black levels, S
Minimum_Intensity←minimum pixel value in the camera image
Maximum_Intensity←maximum pixel value in the camera image
Mode List (NBins elements)←0
```

For each pixel in the camera image, do:

```
Mode_index←Abs(Int((pixel−Minimum_Intensity)/
(Maximum_Intensity − Minimum_Intensity) * NBins))
  Mode ListMode_index←Mode ListMode_Index + 1
  Largest←Mode List0
  Largest_Mode_Location←0
```

For each item in the Mode List≥1, do:

```
If the item>Largest then
Largest←the item
Largest_Mode_Location←the item's location
Intensity_Bias←(Largest_Mode_Location+1)*(Maximum_Intensity−
Minimum_Intensity)/NBins+Minimum_Intensity
```

For each pixel in the camera image, do:

```
         S(pixel) ← S(pixel) − Intensity_Bias
         Return S
```

Once the image bias is calculated and removed therefrom, the signal to noise ratio may be calculated. The signal to noise ratio can determine what the noise floor should be with the power levels above the determined noise floor being used as the base for the power levels above. The image will be referred to as 'P' regardless of whether or not pixel smoothing has been applied. The signal to noise ratio may be calculated according to the following:

```
Input:     Camera image, S
           Apply image smoothing, IsSmoothing
           Centroid Power Percentage, CentroidPercentage
           Centroid Clipping Percentage, ClippingPercentage
Output:    Camera Image, P
           Centroid Power Level, Pc
           Centroid Clipping Level, Ps
           Signal to Noise Ratio, SNR
           Max Error, PeakError
           Max Signal, PeakSignal
           Max Signal Pixel Location, PeakSignalLocation
           Min Signal, MinSignal
PeakError ← 0
PeakSignal ← 0
MinSignal ← MaxFloat
PeakSignalLocation ← 0
```

For each pixel in the camera image except the outermost ring of pixels, do:

```
If IsSmoothing then:
P(pixel)←(1/9)*Sum of 8 adjacent pixels to
S(pixel) including S(pixel)
Else
P(pixel) ← S(pixel)
Error ← abs(P(pixel) − S(pixel))
If Error > PeakError then
PeakError ← Error
If P(pixel) > PeakSignal then
PeakSignal ← P(pixel)
PeakSignalLocation ← pixel location
If P(pixel) < MinSignal then
MinSignal ← P(pixel)
Pc ← PeakSignal * CentroidPercentage
Ps ← PeakSignal * ClippingPercentage
SNR ← PeakSignal / PeakError
```

The image may then be preprocessed using the area of the centroid above the noise floor to reverse-compute a radius, including a margin, to establish a portion of the beam 54 that includes 100% of the energy of the beam 54. According to one aspect, the margin may be about 15%. Preprocessing may effectively remove energy at the outskirts of the energy distribution that is hidden by noise and redistributes the energy into the measured beam profile. The implementation of the redistribution within the measured profile is included in the calculation of the signal geometry routine, discussed below. Preprocessing may be performed according to the following:

```
Input:     Camera image, P
Output:    Centroid Location, Xc and Yc
           Aperture Energy Radius, ApertureRadius
Area ← 0
Sum ← 0
XSum ← 0
YSum ← 0
```

For each pixel in the camera image except the outermost ring of pixels, do:

```
If P(pixel) > Pc then
    Sum ← Sum + P(pixel)
    XSum ← XSum + pixelx * P(pixel)
    YSum ← YSum + pixely * P(pixel)
    If P(pixel) >= Ps then
```

```
        Area ← Area + 1
        If sum > 0 then
            Xc ← XSum / Sum
            Yc ← YSum / Sum
            ApertureRadius ← 1.15 * Sqrt(Area / π)
```

Once preprocessing is complete, the signal geometry may be calculated according to the following:

```
Input:     Camera image, P
           Centroid Location, Xc and Yc
           Aperture Energy Radius, ApertureRadius
Output:    Beam diameter in the X-Axis, Dxx
           Beam diameter in the Y-Axis, Dyy
           For an elliptical beam, diameter in the Major-Axis, Dmajor
           For an elliptical beam, diameter in the Minor-Axis, Dminor
           For an elliptical beam, ratio of Major to Minor-Axis widths,
           Ellipticity
           For an elliptical beam, amount of rotation, Rotation
TotalCentroidPower ← 0
Mxx ← 0
Mxy ← 0
Myy ← 0
MaxCentroidPower ← 0
```

For each pixel in the camera image except the outermost ring of pixels, do:

```
    PixelRadius ← Sqrt( (pixelx − Xc)2 + (pixely − Yc)2)
    If PixelRadius < ApertureRadius and P(pixel) >= 0 then
        Add PixelRadius and P(pixel) to the CentroidPixel
List (will be referred to later as CentroidPixelRadius and
CentroidPixelPower, respectively)
        TotalCentroid Power ← TotalCentroid Power + P(pixel)
            Mxx ← Mxx + (pixelx − Xc)2 * P(pixel)
            Mxy ← Mxy + (pixelx − Xc) * (pixely − Yc) * P(pixel)
            Myy ← Myy + (pixely − Yc)2 * P(pixel)
```

For each power in the CentroidPower list, do:

```
        If TotalCentroidPower > 0 then
            power ← power / TotalCentroidPower
        Else
            power ← 0
        If power > MaxCentroidPower then
            MaxCentroidPower ← power
        If TotalCentroidPower > 0 then
            Mxx ← Mxx / TotalCentroidPower
            Mxy ← Mxy / TotalCentroidPower
            Myy ← Myy / TotalCentroidPower
        Else
            Mxx ← 0
            Mxy ← 0
            Myy ← 0
        G ← Sqrt((Mxx − Myy)2 + 4 * Mxy2)
        Dxx ← 4 * Sqrt (Mxx)
        Dyy ← 4 * Sqrt (Myy)
        DMajor ← 4 * Sqrt((Mxx + Myy + G) / 2)
        DMinor ← 4 * Sqrt((Mxx + Myy − G) / 2)
        DMean ← Sqrt(DMajor * DMinor)
        Ellipticity ← DMajor / DMinor
        If Ellipticity > 1.02 then
            Rotation ← (180 / π) * arcsin((2 * Mxy) /
        Sqrt( (Mxx − Myy + G)2 + 4 *
        Mxy2))
        Else
            Rotation ← 0
```

Next, the calculator can utilize the high point in the center of the beam spot on the detector 20 to compute an angular ring system. Typically, the center of the laser 54 spot on the detector 20 has the highest intensity. The centroid of this spot will sit in a coordination space (X,Y) on the detector 20 wherein a series of concentric rings around the center may be constructed. The X, Y coordinate of each pixel, along with the X, Y coordinate of the beam centrally, may be recorded and used to construct a side profile of the laser beam. The beam profile may be constructed according to the following:

```
Input:     Camera image, P
Output:    Distance from Center List, R
           Radiant Intensity Profile List, J
           Encircled Energy Profile, E
Initialize Hist_Total List with MaxRings elements to 0
Initialize Hist_Min List with MaxRings elements to 0
Initialize Hist_Max List with MaxRings elements to 0
```

For each pixel in the CentroidPixel list, do:

```
Radius_ring ← Floor(pixelRadius + 0.5)
If 0 < Radius_ring < MaxRings then
    Hist_Total(Radius_ring) ← Hist_Total(Radius_ring) + pixelPower
    If PixelCountInRing(Radius_ring) = 0 then
        Hist_max(radius_ring) ← 0
        Mist_min(radius_ring) ← 0
    Else
        If Hist_Min(radius_ring) > pixelPower then
            Hist_Min(radius_ring) ← pixelPower
        If Hist_Max(radius_ring) < pixelPower then
            Hist_Max(radius_ring) ← pixelPower
    PixelCountInRing(Radius_ring) ←
PixelCountInRing(Radius_ring) + 1
Initialize J_Max List with MaxRings elements to 0
Initialize J_Avg List with MaxRings elements to 0
Initialize J_Min List with MaxRings elements to 0
Initialize E List with MaxRings elements to 0
Initialize R List with MaxRings elements to 0
E0 ← 0
```

For PixelRadius from 0 to the MaxPixelRadius, do:

```
E(PixelRadius) ← E(PixelRadius − 1) + (Hist_Total(PixelRadius − 1) +
Hist_Total(PixelRadius)/ 2
R0 ← 0
Emax ← E(MaxPixelRadius)
```

For PixelRadius from 0 to the MaxPixelRadius, do:

```
J_Avg(PixelRadius) ← 0
J_Max(PixelRadius) ← 0
J_Min(PixelRadius) ← 0
If PixelCountInRing(PixelRadius) > 0 then
    J_Avg←Hist_Total(PixelRadius) / PixelCountInRing(PixelRadius)
    J_Min ← Hist_Min(PixelRadius)
    J_Max ← Hist_Max(PixelRadius)
    J_Total(PixelRadius)←J_Total(PixelRadius)+J_Avg(PixelRadius)
    *2*π*radius
If J_Avg(0) = 0 then
    J_Avg(0) = J_Avg(1)
If J_Max(0) = 0 then
    J_Max(0) = J_Max(1)
If J_Min(0) = 0 then
    J_Min(0) =J_Min(1)
```

Fry PixelRadius from 0 to the MaxPixelRadius, do:

```
If J_Total(PixelRadius) <> 0 then
    J_Avg(PixelRadius)←J_Avg(PixelRadius) / J_Total(PixelRadius)
    J_Max(PixelRadius)←J_Max(PixelRadius)/J_Total(PixelRadius)
elRadius)
Else
    J_Avg(PixelRadius) ← 0
    J_Max(PixelRadius) ← 0
    J_Min(PixelRadius) ← 0
If EMax <> 0 then
    E(PixelRadius) ← E(PixelRadius) / Emax
Else
    E(PixelRadius) ← 0
R(PixelRadius) ← PixelRadius
```

Next, the 'K' factor for the beam profile may be calculated from the J_Avg data produced above. The 'K' factor is a mathematical representation of the Gaussian nature of the beam 54. The 'K' factor, or K-Fit, may be calculated according to the following:

```
Input:   Camera image, P
Output:  K-factor, K
Area ← 0    // Area refers to the area under the J versus E curve
If the J_Avg list is empty then
    K ← 0
Else
```

For each ring in the J_Avg except the first list, do:

```
Area←Area + E(ring) * J_Avg(ring − 1) - E(ring − 1) * J_Avg(ring)
If J_Avg(0) <> 0 then
    Area ← Area / (2 * J_Avg(0))
    K ← Ln(4) / - Ln(Area)
Else
    K ← 0
```

From here, the calculator may provide a linear interpolation to solve for the best-fit linear Y-value given an arbitrary X-value from a list of X and Y values. The best-fit Y-value may be calculated according to the following:

```
Input:    X-Values List, X
          Y-Values List, Y
          X-value to find a Y-value for, XVal
Output:   Y-value corresponding to X-value, YVal
index ← 0
```

While (X(index+1)−Xval)*(Xval−X(index))<0 and index is within the X List, do:

```
    index ← index + 1
YVal=(Y(index+1)−Y(index))/(X(index+1)−X(index))*(XVal− (index))+Y(index)
```

Now, the radiant intensity level at a given point on the radiant intensity curve may be found as the diameter along the curve at a given point is indicative of a given radiant intensity at that point. The radiant intensity at any given point may be calculated according to the following:

```
Input:     List of radiant intensity (RI) indexed by Pixel Radii, J_Avg
           List of Pixel Radii, R
           RI Level to search for, RadiantIntensityIn
Output:    Pixel Diameter at which RI curve crosses the RI Level to
search for, D
```

```
            If RadiantIntensityIn < 0 then
                D ← 2 * J_Avg(MaxPixelRadius)
            Else
                PixelRadius←LinearInterpolate(J_Avg,R,MaxRadius,RadiantIntensityIn)
                D ← 2 * PixelRadius
```

Similarly, the energy level at a given point on the energy curve may be found as the diameter along the curve at a given point is indicative of a given energy level at that point. The energy at any given point may be calculated according to the following:

```
    Input:      List of energy (E) indexed by Pixel Radii, E
                List of Pixel Radii, R
                Energy Level to search for, EnergyIn
    Output:     Pixel Diameter at which E curve crosses the Energy Level
to search for, D
            If EnergyIn < 0 then
                D ← 0
            Else
            If EnergyIn > 1 then
                D ← 2 * E(MaxPixelRadius)
            Else
                PixelRadius ← LinearInterpolate(E, R, MaxRadius, EnergyIn)
                D ← 2 * PixelRadius
```

As with radiant intensity and energy, the encircled energy level at a radius may be found using the energy curve and a given diameter. The encircled energy level may be found according to the following:

```
    Input:      List of E indexed by Pixel Radii, E
                List of Pixel Radii, R
                Radius to search for, radius
    Output:     Pixel Diameter at which E curve crosses the Energy Level
to search for, ELevel
            If radius < 0.1 then
                ELevel ← 0
            Else
            If radius >= R_NF(MaxPixelRadius) then
                ELevel ← 1
            Else
                ELevel ← LinearInterpolate(R_NF, E_NF, MaxPixelRadius, radius)
```

Next, the overall radiant intensity and encircled energy may be calculated through normalization of the radiant intensity curve. Radiant intensity and encircled energy at the $1/e$ and $1/e^2$ points may then be calculated according to the following:

```
    Input:      List of E indexed by Pixel Radii, E
                List of Pixel Radii, R
                Radius to search for, radius
    Output:     Pixel Diameter at which E curve crosses the Energy Level
to search for, ELevel
            Call CalcRJE
            // Normalize the J_Avg, J_Max, and J_Min curves
            TotalArea_Avg ← 0
            TotalArea_Max ← 0
            TotalArea_Min ← 0
            For PixelRadius from 0 to the MaxPixelRadius, do
                TotalArea_Avg←TotalArea_Avg+R(PixelRadius)*J_Avg(PixelRadius)
                TotalArea_Max←TotalArea_Max+R(PixelRadius)*J_Max(PixelRadius)
                TotalArea_Min←TotalArea_Min+R(PixelRadius)*J_Min(PixelRadius)
            If TotalArea_Avg <> 0 then
                InverseTotalArea_Avg ← 1 / (2 * π * TotalArea_Avg)
            Else
                InverseTotalArea_Avg ← 0
```

```
If TotalArea_Max <> 0 then
    InverseTotalArea_Max ← 1 / (2 * π * TotalArea_Max)
Else
    InverseTotalArea_Max ← 0
If TotalArea_Min <> 0 then
    InverseTotalArea_Min ← 1 / (2 * π * TotalArea_Min)
Else
    InverseTotalArea_Min ← 0
For PixelRadius from 0 to the MaxPixelRadius, do:
J_Avg (Pixel Radius) ← J_Avg(PixelRadius) * InverseTotalArea_Avg
J_Max (PixelRadius) ← J_Max(PixelRadius) * InverseTotalArea_Max
J_Min (PixelRadius) ← J_Min(PixelRadius) * InverseTotalArea_Min
MaxJ ← 0
For PixelRadius from 0 to the MaxPixelRadius, do:
If J_Avg (PixelRadius) > MaxJ then
    MaxJ ← J_Avg(PixelRadius)
DiaJ_e ← CalcDiaAtIntensityLevel (MaxJ * Exp(-1))
DiaJ_e2 ← CalcDiaAtIntensityLevel (MaxJ * Exp(-2))
DiaE_e ← CalcDiaAtEnergyLevel (1 - Exp(-1))
DiaE_e2 ← CalcDiaAtEnergyLevel (1 - Exp(-2))
```

Now the calculator may construct a profile of the fall-off from the energy distribution profile by first converting pixel data to an angular (far field) coordinate frame and a spatial (near field) coordinate frame. Both angular and spatial coordinate frames are calculated as the data may not provide knowledge to the calculator as to whether the data is near-field or far-field. The coordinate frames may be calculated according to the following:

```
Input:    List of RI indexed by Angle, J_Avg
          List of RI indexed by Angle, J_Min
          List of RI indexed by Angle, J_Max
          List of Energy indexed by Angle, E
          List of Power Factors indexed by Angle, PF
          List of Angle, R
          Major Diameter in pixels, DMajor_NF
          Minor Diameter in pixels, DMinor_NF
          Mean Diameter in pixels, DMean_NF
          Major Diameter in pixels, DMajor
          Minor Diameter in pixels, DMinor
          Mean Diameter in pixels, DMean
          Diameter @ J/e in pixels, DiaJ_e
          Diameter @ J/e2 in pixels, DiaJ_e2
          Diameter @ E/e in pixels, DiaE_e
          Diameter @ E/e2 in pixels, DiaE_e2
          Beam diameter in the X-Axis in pixels, Dxx
          Beam diameter in the Y-Axis in pixels, Dyy
          Optimum Radius in pixels, ROptimum
          Aperture   Energy   Radius   in   pixels,
Aperture_Energy_Radius
Output:   List of RI indexed by Angle, J_Avg
          List of RI indexed by Angle, J_Min
          List of RI indexed by Angle, J_Max
          List of Energy indexed by Angle, E
          List of Power Factors indexed by Angle, PF
          List of Angle, R
          List of Distances, R_NF
          List of Energy, E_NF
          Major Diameter in mm, DMajor_NF
          Minor Diameter in mm, DMinor_NF
          Mean Diameter in mm, DMean_NF
          Major Diameter in mrad, DMajor
          Minor Diameter in mrad, DMinor
          Mean Diameter in mrad, DMean
          Diameter @ J/e in mrad, DiaJ_e
          Diameter @ J/e2 in mrad, DiaJ_e2
          Diameter @ E/e in mrad, DiaE_e
          Diameter @ E/e2 in mrad, DiaE_e2
          Beam diameter in the X-Axis in mrad, Dxx
          Beam diameter in the Y-Axis in mrad, Dyy
          Optimum Radius in mrad, ROptimum
          Aperture   Energy   Radius   in   mrad,
Aperture_Energy_Radius
ScaleFactor ← PixelSpacingInMillimeters / CollimatorFocalLengthInMeters
```

For PixelRadius from 0 to the MaxPixelRadius, do:

```
R_NF (PixelRadius) ← R(PixelRadius) * PixelSpacingInMillimeters
    R (PixelRadius) ← R(PixelRadius) * ScaleFactor
    E_NF (PixelRadius) ← E(PixelRadius)
DMajor_NF ← DMajor * PixelSpacingInMillimeters
DMinor_NF ← DMinor * PixelSpacingInMillimeters
DMean_NF ← DMean * PixelSpacingInMillimeters
DMajor ← DMajor * ScaleFactor
DMinor ← DMinor * ScaleFactor
DMean ← DMean * ScaleFactor
DiaJ_e ← DiaJ_e * ScaleFactor
DiaJ_e2 ← DiaJ_e2 * ScaleFactor
DiaE_e ← DiaE_e * ScaleFactor
DiaE_e2 ← DiaE_e2 * ScaleFactor
Dxx ← Dxx * ScaleFactor
Dyy ← Dyy * ScaleFactor
ROptimum ← ROptimum * ScaleFactor
Aperture_Energy_Radius ← Aperture_Energy_Radius * ScaleFactor
ScaleFactor ← 1000 / ScaleFactor
ScaleFactor ← ScaleFactor2 / 1000
```

For PixelRadius from 0 to the MaxPixelRadius, do:

```
J_Avg ← J_Avg * ScaleFactor
J_Max ← J_Max * ScaleFactor
J_Min ← J_Min * ScaleFactor
```

The next step in constructing the fall-off profile is to calculate the power factor of beam 54. The power factor may be calculated according to the following:

```
Input:   List of RI indexed by Angle, J_Avg
         List of Angle, R
Output:  Power Factor Curve, PF
         Max Power Factor, MaxPF
         Optimal Pixel Radius, ROptimum
MaxPF ← 0
```

For PixelRadius from 0 to the MaxPixelRadius, do:

```
PF(PixelRadius)←Exp(1)*π*R(PixelRadius)
2*J_Avg(PixelRadius)/1000
If PF(PixelRadius) > MaxPF then
    MaxPF ← PF(PixelRadius)
    ROptimum ← PixelRadius
```

Constructing the radiant intensity profiled of the beam 54 may optionally include a final step of recalling the arrays using linear interpolation. For example, the rescaling may be done for a 1 pixel resolution to recalculate the arrays for a 0.1 mrad resolution. The rescaling of the arrays may be done according to the following:

```
Input:   List of RI indexed by Angle, J_Avg
         List of RI indexed by Angle, J_Min
         List of RI indexed by Angle, J_Max
         List of Energy indexed by Angle, E
         List of Power Factors indexed by Angle, PF
         List of Angle, R
         New angular spacing, spacing_mrad
Output:  List of RI indexed by Angle, J_Avg
         List of RI indexed by Angle, J_Min
         List of RI indexed by Angle, J_Max
         List of Energy indexed by Angle, E
         List of Power Factors indexed by Angle, PF
         List of Angle, R
```

-continued

```
Make copies of the existing arrays
MaxR ← maximum angle in the array R
Old_index_size ← number of elements in array R
```

For index from 0 to the MaxR, do:
R(index)←spacing_mrad*index
J_Avg(index)←LinearInterpolation(oldR, oldJ_Avg, old_index_size, R(index))
J_Min(index)←LinearInterpolation(oldR, oldJ_Min, old_index_size, R(index))
J_Max(index)←LinearInterpolation(oldR, oldJ_Max, old_index_size, R(index))
E(index)←LinearInterpolation(oldR, oldE, old_index_size, R(index))

With reference to FIGS. 2 and 3, the calculator may then be used to determine the time centered angular positions of first beam 54A and second beam 54B relative to each other, including temporal matrix around how well the two beams 54A, 54B are co-aligned. The calculator may also provide a special profile of first beam 54A on first detector 20A and a special profile of second beam 54B on detector 20B measured simultaneously through use of splitter 70 as an optical wedge. As described herein, any error based movement or absorption due to the varying thickness of the wedge may be calculated and subtracted out as described herein. The calculator may then be used to also provide the special and temporal characteristics of drift over time relative to a fixed point. This drift may also be calculated for first beam 54A relative to second beam 54B even when one or both beams 54A, 54B move during testing.

With reference to FIG. 5, a flowchart is provided depicting the process herein. The process generally indicated at 500 may have the following steps which may be performed in the presented order or in any other order as dictated by the implementation parameters.

First, the BDA 14 and laser 54 may be aligned using reference laser generator 16 and reference laser 62 as described herein. The alignment of BDA 14 and laser 54 is indicated as reference 502. Next, step 504 of method 500 is to generate the laser 54 from BDA 14, directing the laser off the off-axis parabola 18 and towards the detector 20. According to step 506, beam 54 may be split into a first beam 54A and a second beam 54B prior to reaching detectors 20A and 20B. Step 506 may also include filtering beams 54A and 54B prior to reaching detectors 20A and 20B. Detectors 20A and 20B may then record and provide laser beam 54 data to calculator, indicated as step 508.

Next, step 510 generally refers to the calculation of the radiant intensity profile of the laser beam 54, as discussed further below. For purposes of clarity, when step 510 is complete, method 500 then dictates that the resultant radiant intensity profile be compared to the predetermined laser criteria as step 530. If the radiant intensity profile of the test laser fails to meet the criteria, then the test laser is rejected as step 532 and the test laser may be tested again at a later time after warranted repairs, modifications, or further development efforts are complete. Alternatively, the test laser may be outright rejected and disposed of as deemed necessary by a person of skill in the art.

If, however, the radiant intensity profile of the test laser meets or exceeds the preset criteria, the test laser may be approved for further testing and/or implementation into the desired application. Approval of the test laser is indicated as step 534.

As fully discussed above, the calculation of the radiant intensity profile (step 510) includes several sub-steps. First, an image of the laser 54 on the detector 20 may be oriented as sub-step 512. Next, step 514 is the calculation and removal of the image bias, after which the signal to noise ratio may be calculated in step 516. After the signal to noise ratio is calculated, the image may be preprocessed in step 518. From there, the signal geometry of the image may be computed in step 520. Step 522 includes calculating the intensity energy of the laser 54 through calculation of the radiant intensity level at a given point, the energy at a given point, the encircled energy levels, and the normalization of the radiant intensity curve. Next, in step 524, the 'K' factor may be calculated to compare the energy profile to an idealized Gaussian curve, after which the construction of the fall-off profile may be completed through conversion of the pixels to both angular and spatial coordinate frames in step 526. Calculation of the radiant intensity profile then involves computation of the power factor, indicated as step 528, and optionally the rescaling of the arrays (not shown in method 500).

Each of the sub-steps (steps 512-528) of method 500 are discussed in detail herein, and have been omitted from the discussion here for purposes of brevity and clarity. It will be understood, however, that these sub-steps may be performed at times other than when indicated in method 500, in an order different from the order in which they are provided, or may alternatively be omitted if the specific implementation of method 500 warrants the omission thereof.

It will be understood that calculator may accept the input of data directly from detector 20, detectors 20A and 20B, or may alternatively accept data as entered by an operator, or as provided through an intermediary without deviation from method 500 as discussed herein.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method of collecting laser data comprising:
generating a reference laser beam from a reference laser generator;
reflecting the reference laser beam off a face of a beam director assembly to a detector;
recording the coordinates of the reference laser beam on the detector;
turning the reference laser generator off;
transmitting a test laser beam from the beam director assembly to the detector; and
recording laser data from the test laser beam via the detector.

2. The method of claim 1 further comprising:
reflecting the reference laser beam off of an off-axis parabola between reflecting the reference laser beam off a face of the beam director assembly and reflecting the reference laser beam to the detector.

3. The method of claim 1 wherein the detector is a focal plane array.

4. The method of claim 1 further comprising:
passing the test laser beam from the beam director assembly through at least one spectral filter before it reaches the detector.

5. The method of claim 1 further comprising:
splitting the test laser beam from the beam director assembly into a first beam having a first beam path and a second beam having a second beam path after generating the test laser beam from the beam director assembly; and,
directing the first beam of the test laser beam to a first detector and directing the second beam of the test laser beam to a second detector.

6. The method of claim 5 further comprising:
recording laser data from the first beam via the first detector; and
recording laser data from the second beam via the second detector.

7. The method of claim 6 wherein recording laser data from the first beam via the first detector and recording laser data from the second beam via the second detector occurs simultaneously.

8. The method of claim 6 wherein splitting the test laser beam is accomplished by an optical wedge.

9. The method of claim 8 wherein the optical wedge has a first quadrant, a second quadrant, a third quadrant, and a fourth quadrant, the method further comprising:
splitting the test laser beam into the first beam and second beam by directing the test laser beam to each of the first, second, third, and fourth quadrants of the optical wedge; and
recording the laser data from the first beam via the first detector and the second beam via the second detector for each test laser beam position from the first, second, third, and fourth quadrants of the optical wedge.

10. The method of claim 6 further comprising:
passing the first beam through at least one spectral filter before it reaches the first detector; and,
passing the second beam through at least one spectral filter before it reaches the second detector.

11. A method of analyzing laser data comprising:
transmitting a test laser beam having at least two wavelengths from a beam director assembly to a detector;
recording the (x,y) coordinates of a beam spot centroid on the detector;
recording the (x,y) coordinates of a plurality of pixels in the detector;
calculating a radiant intensity profile of the test laser beam; and,
comparing the radiant intensity profile of the test laser beam to a criteria profile to determine if the laser beam meets or exceeds the criteria profile.

12. The method of claim 11 further comprising:
rejecting the laser beam if it fails to meet the criteria profile or accepting the laser beam if it meets or exceeds the criteria profile.

13. The method of claim 11 wherein the detector is a focal plane array detector.

14. The method of claim 13 further comprising:
filtering the test laser beam to a single wavelength prior to reaching the detector; and
measuring the wavelength of the test laser beam at the detector.

15. The method of claim 14 wherein calculating the radiant intensity profile further comprises:
orienting an image of the test laser beam on the detector;
subtracting image bias from the detector image;
calculating the signal to noise ratio of the image;
calculating the pixel coordinates of the image centroid and the aperture energy radius;
calculating the beam diameter and the angular skew of the test laser beam;

calculating the intensity energy of the test laser beam;
comparing the intensity profile to an ideal Gaussian profile;
converting pixel data to an angular coordinate frame and a spatial coordinate frame; and,
calculating the power factor of the test laser beam.

16. The method of claim 15 further comprising:
splitting the test laser beam into a first beam with a first beam path directed to a first detector and a second beam with a second beam path directed to a second detector prior to filtering the test laser beam;
filtering the first beam to a first wavelength prior to reaching the first detector;
filtering the second beam to a second wavelength prior to reaching the second detector; and,
measuring the first wavelength at the first detector and the second wavelength at the second detector.

17. The method of claim 16 wherein splitting the test laser beam is accomplished by an optical wedge.

18. The method of claim 17 wherein the optical wedge has a first quadrant, a second quadrant, a third quadrant, and a fourth quadrant, the method further comprising:
splitting the test laser beam into the first beam and second beam by directing the test laser beam to each of the first, second, third, and fourth quadrants of the optical wedge; and
measuring the first wavelength at the first detector and the second wavelength at the second detector for each laser beam position from the first, second, third, and fourth quadrants of the optical wedge.

19. A method of collecting and analyzing laser beam data comprising:
generating a reference laser beam from a reference laser generator;
reflecting the reference laser beam off a face of a beam director assembly to a detector;
recording the coordinates of the reference laser beam on the detector;
turning the reference laser generator off;
transmitting a test laser beam having at least two wavelengths from the beam director assembly to the detector;
recording the (x,y) coordinates of a beam spot centroid on the detector;
recording the (x,y) coordinates of a plurality of pixels in the detector;
calculating a radiant intensity profile of the test laser beam; and,
comparing the radiant intensity profile of the test laser beam to a criteria profile to determine if the test laser beam meets or exceeds the criteria profile.

20. The method of claim 19 wherein calculating the radiant intensity profile further comprises:
orienting an image of the test laser beam on the detector;
subtracting image bias from the detector image;
calculating the signal to noise ratio of the image;
calculating the pixel coordinates of the image centroid and the aperture energy radius;
calculating the beam diameter and the angular skew of the test laser beam;
calculating the intensity energy of the test laser beam;
comparing the intensity profile to an ideal Gaussian profile;
converting pixel data to an angular coordinate frame and a spatial coordinate frame; and,
calculating the power factor of the test laser beam.

* * * * *